(12) United States Patent
Olster et al.

(10) Patent No.: US 6,426,124 B2
(45) Date of Patent: Jul. 30, 2002

(54) PROCESSED FIBER FOR EMISSION OF ENERGY INTO A MEDIUM AND METHOD THEREFOR

(75) Inventors: Elliot F. Olster, Hamden; Dennis Joseph Peterlin, Stratford; Thomas Dannenhoffer, Bethany, all of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/789,628

(22) Filed: Feb. 22, 2001

Related U.S. Application Data

(62) Division of application No. 09/217,731, filed on Dec. 21, 1998, now Pat. No. 6,245,194.

(51) Int. Cl.[7] .............. C08J 7/18; C08F 2/48; C08F 2/46; H05B 6/10
(52) U.S. Cl. ............ 427/487; 427/508; 427/522; 219/633; 219/634
(58) Field of Search .................. 427/508, 521, 427/522, 554, 516, 517, 518, 104, 487, 496, 498, 500, 501, 512, 514, 515, 505; 219/633, 634

(56) References Cited

U.S. PATENT DOCUMENTS

| | | | |
|---|---|---|---|
| 2,594,096 A | * 4/1952 | Trigg | 117/93 |
| 3,645,816 A | 2/1972 | Billias et al. | 156/94 |
| 4,089,763 A | 5/1978 | Dart et al. | 205/159.23 |
| 4,222,835 A | 9/1980 | Dixon | 204/159.16 |
| 4,228,062 A | 10/1980 | Lee, Jr. et al. | 260/42.28 |
| 4,352,707 A | 10/1982 | Wengler et al. | 156/359 |
| 4,426,243 A | 1/1984 | Briggs | 156/307.3 |
| 4,613,744 A | 9/1986 | Fraser | 219/200 |
| 4,743,740 A | 5/1988 | Adee | 219/548 |
| 4,801,528 A | 1/1989 | Bennett | 433/220 |

(List continued on next page.)

OTHER PUBLICATIONS

Polymerizations and Properties of Polymer–Stabilized Ferroelectric Liquid Crystals, pp. 15–20 and cover page.
Conjugated Polymeric Materials: Opportunities in Electronics, Optoelectronics, and Molecular Electronics, by J.L. Bredas and R.R. Chance; Kluwer Academic Publishers, pp. 115–131.

Primary Examiner—Shrive P. Beck
Assistant Examiner—Eric B. Fuller
(74) Attorney, Agent, or Firm—Carlson Gaskey & Olds

(57) ABSTRACT

A processed fiber is used to distribute energy from an electromagnetic (EM) energy source to a material in which the fiber is embedded. The electromagnetic energy source supplies electromagnetic energy to the fiber and the fibers emit portions of the EM energy along the length of the fiber. The sealant material absorbs a quantity of the electromagnetic energy sufficient to cure the sealant material and propagates excess electromagnetic energy through the sealant material without significant additional absorption. This prevents the sealant material from over-curing. Additionally, a fully cured material can be used to generate thermal energy and thereby serve as a heat blanket that can be used to de-ice aircraft.

13 Claims, 4 Drawing Sheets

U.S. PATENT DOCUMENTS

| | | | | |
|---|---|---|---|---|
| 4,816,106 A | | 3/1989 | Turris et al. | 156/285 |
| 4,820,564 A | | 4/1989 | Cologna et al. | 428/63 |
| 4,836,030 A | * | 6/1989 | Martin | 73/800 |
| 4,851,517 A | * | 7/1989 | Brossia et al. | 340/583 |
| 4,874,948 A | | 10/1989 | Cielo et al. | 250/341 |
| 4,875,644 A | | 10/1989 | Adams et al. | 244/134 |
| 4,895,322 A | | 1/1990 | Zieve | 244/134 |
| 4,900,891 A | | 2/1990 | Vega et al. | 219/121.6 |
| 5,005,005 A | | 4/1991 | Brossia et al. | 340/604 |
| 5,122,504 A | | 6/1992 | Gazit et al. | 505/1 |
| 5,132,083 A | | 7/1992 | Takeda et al. | 420/472 |
| 5,187,346 A | | 2/1993 | Bilge et al. | 219/121.64 |
| 5,239,026 A | | 8/1993 | Babirad et al. | 526/245 |
| 5,266,764 A | | 11/1993 | Fox et al. | 219/10.75 |
| 5,306,897 A | | 4/1994 | Fraser | 219/535 |
| 5,314,145 A | | 5/1994 | Rauckhorst, III | 244/134 |
| 5,328,539 A | * | 7/1994 | Sato | 156/275.5 |
| 5,429,327 A | | 7/1995 | Adams | 244/134 |
| 5,442,156 A | | 8/1995 | Westerman et al. | 219/243 |
| 5,449,133 A | | 9/1995 | Ely et al. | 244/134 |
| 5,475,204 A | | 12/1995 | Giamati et al. | 219/548 |
| 5,508,496 A | * | 4/1996 | Hansen et al. | 219/633 |
| 5,584,450 A | | 12/1996 | Pisarski | 244/134 |
| 5,590,854 A | | 1/1997 | Shatz | 244/206 |
| 5,597,140 A | | 1/1997 | Madsen | 244/134 |
| 5,609,314 A | | 3/1997 | Rauckhorst, III et al. | 244/134 |
| 5,614,292 A | | 3/1997 | Saylor | 428/209 |
| 5,615,849 A | | 4/1997 | Salisbury | 244/134 |
| 5,656,185 A | | 8/1997 | Findlan et al. | 219/121.64 |
| 5,657,951 A | | 8/1997 | Giamati | 244/134 |
| 5,712,469 A | * | 1/1998 | Chaffin et al. | 219/765 |
| 5,750,962 A | | 5/1998 | Hyatt | 219/528 |
| 5,765,779 A | | 6/1998 | Hancock et al. | 244/134 |
| 5,770,296 A | * | 6/1998 | Remerowski et al. | 428/80 |
| 5,782,435 A | | 7/1998 | Ingram et al. | 244/134 |
| 5,804,799 A | | 9/1998 | Stewart | 219/528 |
| 5,806,796 A | | 9/1998 | Healey | 244/117 |
| 5,823,474 A | | 10/1998 | Nunnally | 244/134 |
| 6,103,812 A | * | 9/2000 | Wei et al. | 524/496 |
| 6,217,695 B1 | * | 4/2001 | Goldberg et al. | 156/244.17 |

* cited by examiner

US 6,426,124 B2

PROCESSED FIBER FOR EMISSION OF ENERGY INTO A MEDIUM AND METHOD THEREFOR

This application is a division of U.S. application Ser. No. 09/217,731, filed Dec. 21, 1998 now U.S. Pat. No. 6,245,194.

BACKGROUND OF THE INVENTION

1. Field of the Invention

This invention relates generally to a method and apparatus for a specially processed fiber to distribute energy to a medium in which the fiber is embedded. More particularly, this invention relates to a processed fiber embedded in a sealant material that is capable of propagating excess energy through the sealant material without substantial absorption.

2. Description of the Art

Sealant materials are used to repair structure parts of aircraft such as helicopters, by adhering parts that require repair. The sealant material interacts with the structure and can adhere broken portions or seal cracks. Unfortunately, conventional sealant materials used to repair aircraft parts require extended periods of time to adequately cure. This removes the aircraft from active flight status for several hours. Curing the sealant material can be enhanced by using an external source of thermal energy, such as a heating blanket. However, since the sealant material may have poor thermal conductivity, there may be unbalanced curing of the material. For example, a portion of the sealant material in close proximity to the heat source may be over-cured, while a portion of the sealant more remote from the heat source may remain essentially uncured. Thus, the physical properties of the sealant materials necessitate extended cure times causing an aircraft to be removed from active status while the sealant cures.

A second drawback to curing processes that utilize conventional external heat sources is that these heat sources are typically bulky and cumbersome. Application of an external heat source may require removal of components and/or cargo from the aircraft to enable access for the repair operation. Furthermore, the use of a bulky heat source makes access to small areas difficult. Additionally, thermal blankets and electric heat sources may spark and are therefore a fire hazard.

For thick repair regions, the poor thermal conductivity of the sealant material could preclude proper heating of the repair sealant. In order to adequately cure the entire sealant volume, the additional heat often results in over heating, and weakening, of the surrounding regions.

Separately, U.S. Pat. No. 5,770,296 discloses an adhesive device that absorbs electromagnetic waves contiguous with a heat-activatable adhesive material. This reference does not solve the problem of efficient curing because a portion of the adhesive material closest to the heat energy will cure before a portion of adhesive material further from the heat source. This reference is hereby incorporated by reference. Furthermore, this reference does not relate to aircraft or repairing parts on aircraft. Therefore, what is needed to streamline aircraft and other structure repair is a process for repairing damage that is time efficient and does not introduce the unnecessary risk of spark that is present with electric heating blankets. Fibers, such as optical fibers, typically provide a conduit for signals or energy to be transmitted to a destination location, which is usually at a terminal end of the fiber. However, it has been discovered that processing a fiber and embedding the processed fiber in a medium permits energy to be distributed along the length of the fiber and absorbed by the medium generally uniformly. Specifically, embedding processed fibers in a curable sealant material facilitates rapid uniform cure of the sealant.

BRIEF SUMMARY OF THE INVENTION

One embodiment of the instant invention is drawn to a system for adhering a sealant material to a structure. This system comprises an electromagnetic energy source for supplying electromagnetic (EM) energy. The sealant material is mounted on the structure for interfacing with the structure. One or more fibers are embedded in the sealant material for receiving electromagnetic energy from the electromagnetic energy source and transmitting the electromagnetic energy within the sealant material. The sealant material absorbs a quantity of the electromagnetic energy sufficient to cure the sealant material and propagates excess electromagnetic energy through the sealant material without significant additional absorption. The embedded fibers facilitate uniform cure of the sealant material.

A second embodiment of the instant invention is drawn to a method for adhering a sealant to a structure. This method comprises:

disposing the sealant material on at least a portion of the structure;

providing electromagnetic energy to the sealant material;

transmitting electromagnetic energy through the sealant material via fibers embedded in the sealant material thereby curing the sealant material such that the sealant material fixedly adheres to the structure; and propagating excess electromagnetic energy through the sealant material without substantial absorption of the excess electromagnetic energy by the sealant material.

A third embodiment of the instant invention is drawn to a method for delivering energy to a material using embedded fibers. This method comprises:

providing an energy source for supply electromagnetic energy to a fiber;

processing the fiber such that the fiber emits a portion of the electromagnetic energy from one or more intermediate sections of the fiber; and embedding the fiber in a material;

wherein the processing is selected from the group consisting of bending, doping, crimping, scratching, coating and etching and combinations thereof.

A fourth embodiment of the instant invention is drawn to an apparatus for delivering energy to a material. This apparatus comprises an electromagnetic energy source for providing electromagnetic energy. One or more processed fibers are embedded in the material. The fibers receive electromagnetic energy from the electromagnetic energy source and disburse at least a portion of the electromagnetic energy from one or more intermediate sections of the fiber to the material.

The fibers are processed using a technique selected from the group consisting of scratching, etching, coating doping, crimping, and bending and combinations thereof.

A fifth embodiment of the instant invention is forming a heating mat with fibers embedded in the mat. The mat can be a heat blanket to provide thermal energy to a structure.

Each of these embodiments is particularly useful in the repairing and reconstruction of aircraft, such as helicopters.

DETAILED DESCRIPTION OF THE INVENTION

The instant invention utilizes processed fibers embedded in a material to propagate electromagnetic (EM) energy through the material. The EM energy can be photonic energy, thermal energy or a combination of photonic and thermal energy.

Figure 1:
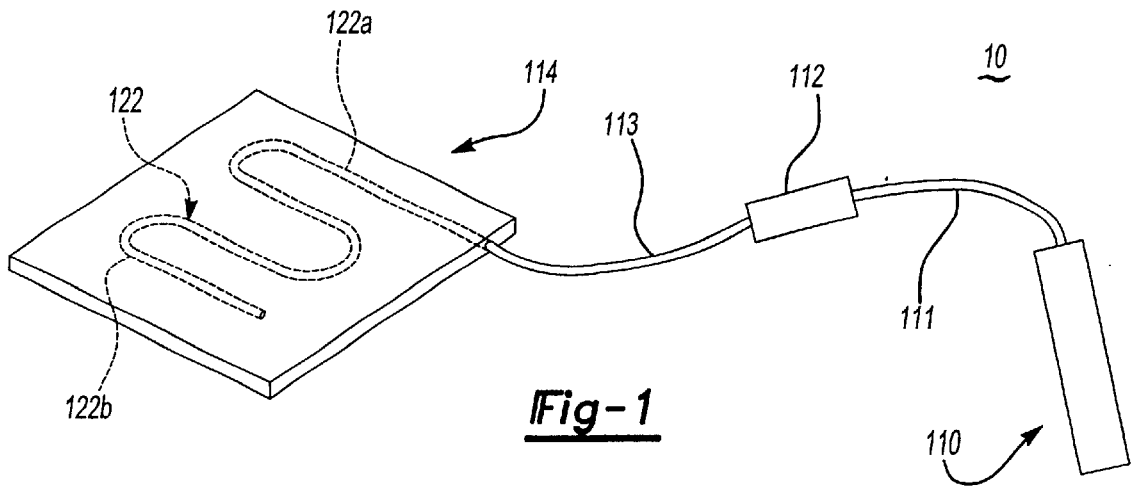
FIG. 1 shows a first embodiment of the instant invention that uses a single fiber embedded in a material.

FIG. 1 shows a first embodiment 10 of the instant invention. As shown by the system 10, an electromagnetic energy source 110 emits electromagnetic (EM) energy to coupler 112 via an interconnector 111. Interconnector 111 is suitably a fiber. The electromagnetic energy source 110 is suitably a laser source such as a $CO_2$ laser, Ho:YAG laser, Er:YAG laser, a diode laser, a Nd:YAG laser or a ruby laser. The Nd:YAG laser has a wavelength of 1.06 microns and is suitably a Heraeus, 60W, CW laser. The coupler 112 is used to connect the electromagnetic energy source 110 to fiber 122 (only one fiber 122 is shown but a plurality of fibers could be used) via interconnector 113 which is typically a fiber. Material 114 is suitably a B-stage resin, a prepreg material a thermosetting polymer or a thermoplastic polymer. The material 114 is suitably mounted to a structure (not shown) such as an aircraft or other structure and receives electromagnetic energy from the EM source 110 through coupler 112. The fiber 122, which is suitably a transmissive fiber, is processed to disburse energy along intermediate portions 122(a) and 122(b) of the fiber 122. Examples of processing include: doping, bending, scratching, etching, coating, and crimping as well as combinations thereof.

Doping of the fiber 122 will cause the fiber 122 to emit energy along the length of fiber 122. Rare-earth dopants can be added to silica or other oxide glass fibers to selectively absorb radiation. For example, samarium can be used with an Nd:YAG laser and praseodynium, europium, and terbium can be used with a Ho:YAG laser. Metallic particles such as silver may be added to a glass fiber in the from of AgBr. The fiber 122 may also be doped to have a leached cladding making it porous to liquids.

Bending the fiber 122 is typically accomplished by micro-bending and/or macro-bending to out-couple a set amount of EM energy. Energy losses occur at bends and the amount of energy emitted can be controlled by the type of bend in the fiber 122.

The surface of the fiber 122 can be scratched using emery paper, such as 500 grit emery paper.

Chemical etching can also be used to alter the fiber 122.

The fiber 122 may also be coated with materials such as epoxy, paint and varnish to induce leakage along the length of the fiber.

The fiber 122 may also be crimped or fusion spliced to create thick portions of fiber at predetermined intervals.

Fiber 122 is suitably a polymer clad silica (PCS) fiber, hard clad silica (HCS) fiber, a glowing fiber, sapphire fiber or a PCS fiber with high power connections. The fiber 122 suitably has a core size of approximately 400 microns and is up to approximately 3 meters in length. The actual dimensions of the fiber depend on the desired application.

The energy is disbursed along the fiber 122, which is embedded in material 114, and causes the material 114 to cure. The material 114 is suitably selected from materials that are photo-catalytic, which utilize photonic energy for curing. The photocatalytic material absorbs the EM energy and forms ions. This photochemical reaction does not generate a significant amount of heat when the fibers are processed to emit energy in the form of photons rather than thermal energy. Excess photonic energy, which is not absorbed, simply dissipates and does not significantly increase the temperature of material 114 or an object that is in proximity or in contact with material 114.

Material 114 is suitably phenylazide that can be photo-polymerized by EM energy. Further details relating to this material is the subject of "Conjugated Polymeric Materials: Opportunities in Electronics, Optoelectronics and Molecular Electronics", by J. C. Bredas et al., 1990, which is incorporated by reference in its entirety herein. The material 114 is suitably positioned in locations that are difficult to access. Once the material 114 is positioned, it is not necessary to add a thermal blanket to cure material 114.

Figure 2A:
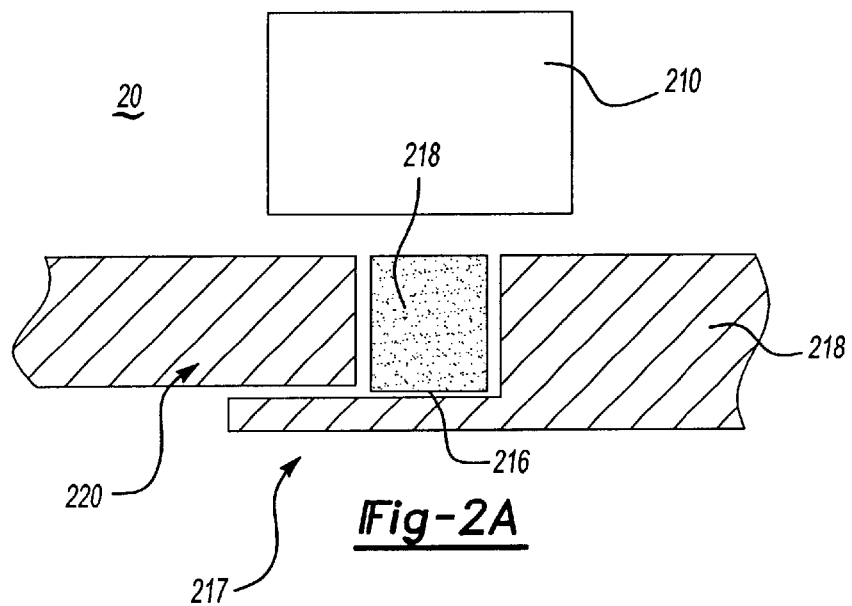
FIGS. 2A and 2B show a second embodiment of the instant invention that uses a heat blanket as a source of thermal energy.
Figure 2B:
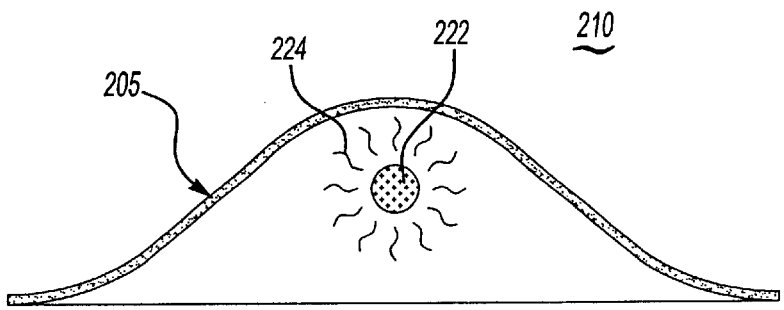

FIGS. 2A and 2B show a second embodiment 20 of the instant invention, which is implemented for the repair of a structure shown as 217. Structure 217 has two portions, a first portion 220, which is suitably an access panel on an aircraft and second portion 218, which is suitably the fuselage of an aircraft. A cavity 219 is suitably filled with sealant material 216. The sealant material 216 is typically an epoxy, caulk, resin, thermoset polymer, thermoplastic polymer, B-stage resin, liquid resin or any suitable adhesive material for repairing structure 217.

A heat source 210 is placed in proximity to the sealant material 216 so that thermal energy from the source 210 is transmitted to the sealant material 216 to enable curing of the sealant material 216.

FIG. 2B shows the heat source 210 as a mat 205 that has one or more fibers 222 (only one fiber is shown). The fiber 222 is processed so that it disburses thermal energy along its length at intermediate portions. The surrounding material 205 can be positioned so as to provide heat to a structure 217. The material 205 is suitably an epoxy material or a thermoplastic polymer. The sealant material 216 may also have processed fibers (not shown) that can transmit and disperse thermal energy from mat 205 throughout sealant material 216. Thus FIGS. 2A and 2B show that the processed fibers 222 can be used to disburse thermal energy 224, from an EM source (not shown) in a heating blanket to sealant material 216. This facilitates enhanced and more uniform curing of sealant material 216.

Figure 3:
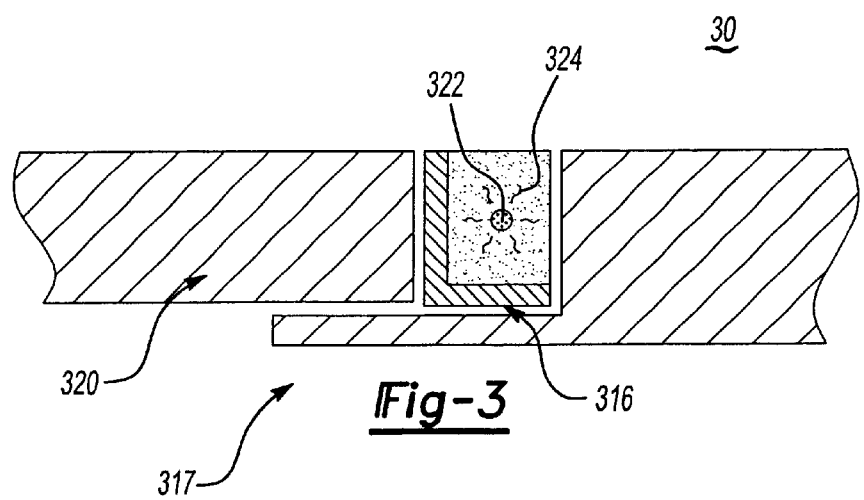
FIG. 3 shows a third embodiment of the instant invention.

FIG. 3 shows a third embodiment 30 in which the sealant material 316 is embedded with a plurality of fibers shown as fiber 322, for the distribution and transmission of EM energy 324, from an EM source (not shown in FIG. 3), within the sealant material 316. Similar to FIG. 2A, a first portion 320 of a structure 317 can be attached to a second portion 318 of structure 317 utilizing the sealant material 316. The sealant material 316 is suitably an epoxy resin, a stage B resin, a caulking material, or a liquid resin. The fibers 322 are processed so as to disburse and/or dispense and/or transmit EM energy 324 along their length.

In one embodiment, fibers 322 are suitably made from glass, or plastic such as silicone, acrylic and plexiglass, and are processed to emit substantially entirely photonic energy. Glass or plastic fibers have the advantage that they are radar transparent and can be used for low observable (LO) applications. The glass or plastic fibers are suitably used in LO applications for repairs that do not reach the ground plane of an aircraft. The sealant material 316 is suitably a photosensitized material, which absorbs the photonic energy. The photochemical reaction does not generate substantial heat due to the use of photonic energy. The fibers 322 provide photons for curing the sealant material 316. The use of this photochemical reaction prevents the sealant material 316 from over curing and/or burning. Areas surrounding the repair area (i.e. 318, 320) will not be subjected to excess heat, which could damage the structure 317. The sealant material 316 is typically in a solid form for easy manipulation at ambient temperatures. The sealant material 316 is also typically fabricated such that exposure to ambient light will not cause the sealant material 316 to significantly cure.

Figure 4:
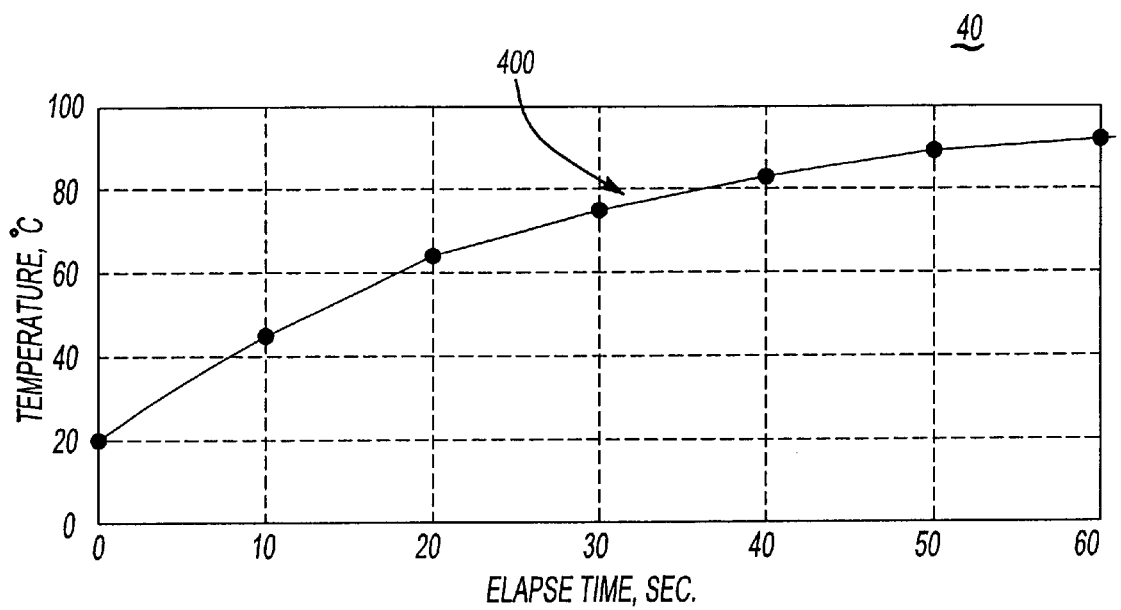
FIG. 4 shows a graph of curing data for the instant invention.

FIG. 4 shows a graph 40 of temperature versus time for the curing of a sealant material as described herein. Graph 40 shows temperature in degrees Celsius plotted on the Y axis and time in seconds plotted on the X axis. As shown by line 410, the temperature of the sealant material, which in this case is a resin exposed to an Nd:YAG laser and has embedded scratched fibers that were micro-bent. This experiment demonstrated sufficient energy was transferred in 60 seconds to adequately cure the material.

Maintaining the temperature below 100° C. helps prevent over-curing of the sealant material. A stable temperature below 100° C. also helps prevent combustion of the sealant material, thereby reducing the risk of fire.

Figure 5A:
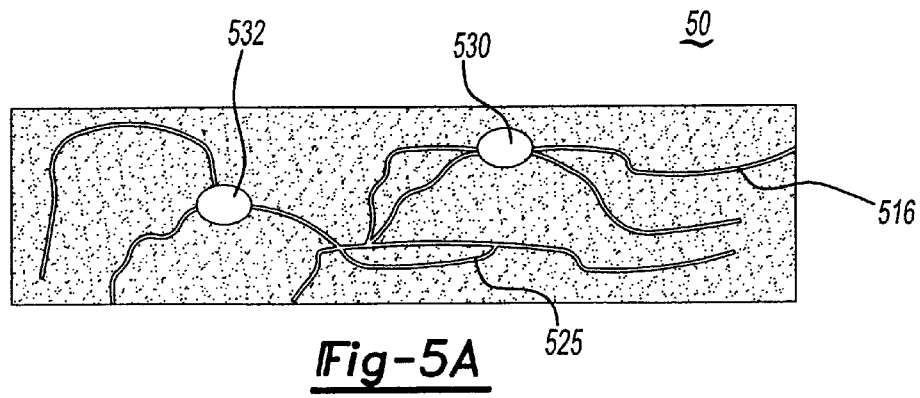
FIGS. 5A and 5B show stages of a resin material that has a self-limiting cure.
Figure 5B:
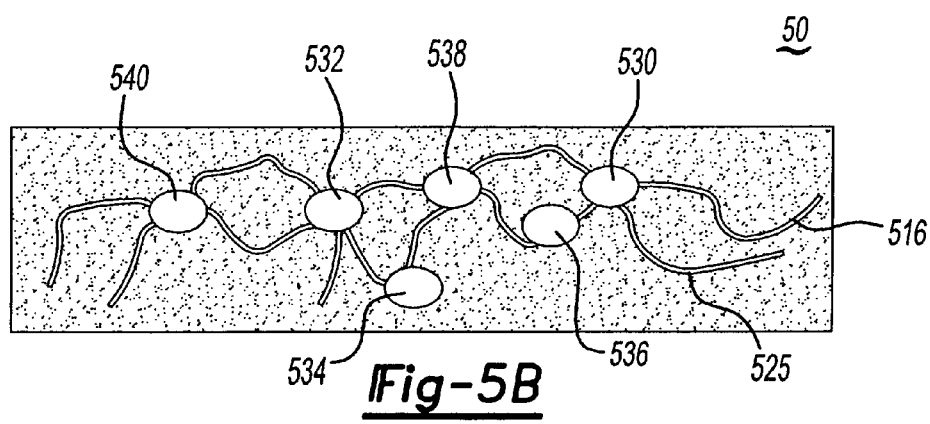

FIG. 5A shows an illustration 50 of a B-staged resin material that has the properties of self-limiting cure. As shown in FIG. 5A, cross links 530 and 532 are present in the resin material 516 and 525 is the polymer chain. As shown in FIG. 5B, the density of the cross links, shown as 530, 532, 534, 536, 538, and 540 increases with time. The density of the cross links in the resin material 516 is substantially greater in FIG. 5B than in FIG. 5A. As additional EM energy (not shown) is added to the material 516, the cross link density increases. This increase in cross-link density changes the frequency of the polymer chain 525. The new frequency is no longer "excited" by the EM frequency inputted to the material 516. This change of natural frequency results in the curing material 516 being self-limiting. This self-limiting feature prevents over heating of the curing material 516 because the excess EM energy will be dissipated from the material 516 and not a significant amount of EM energy will be absorbed by the portion of the sealant material 516 that has been cured.

Figure 6:
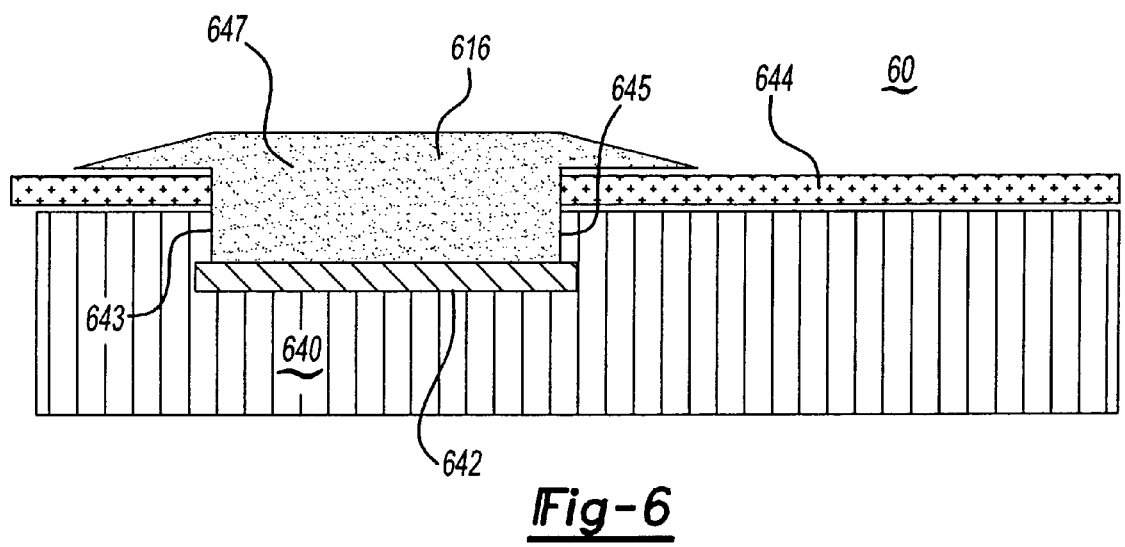
FIG. 6 shows a fourth embodiment of the instant invention for repairing an aircraft.

FIG. 6 shows a fourth embodiment 60 of the instant invention. As shown in FIG. 6, structure 640 is suitably a honeycomb structure and a repair area 647 is filled with sealant material 616 that has fibers (not shown) embedded therein. The sealant material 616 receives energy from an energy source (not shown) and the embedded fibers distribute at least a portion of the energy to material 616. Sealant material 616 bonds to bond area 642 in cavity 647 as well as the side portions 643, 645 of cavity 647 thereby returning the structure 640 to a useable form. The sealant material 616 suitably experiences proper curing despite a relatively thick cavity portion 647 because the embedded fibers disperse the energy substantially uniformly throughout sealant material 616. The ability for the sealant material 616 to propagate EM energy without over curing enables the instant invention to provide adequate repair to structure 640. The sealant material 616 also bonds to surface 644, providing added stability to the repair site. In this embodiment, which requires a relatively thick repair region 647, it is preferable to use fibers that are processed to emit more photonic energy than thermal energy to inhibit a substantial increase in temperature.

Figure 7:
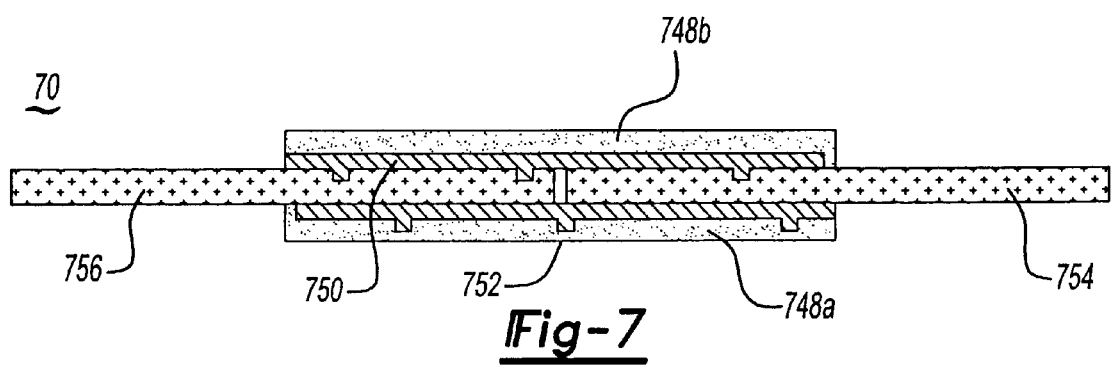
FIG. 7 shows a fifth embodiment of the instant invention using a prepreg material.

FIG. 7 shows a fifth embodiment 70 of the instant invention. Two portions 754, 756 of a structure 752 are bonded by applying doublers 748(a) and 748(b) to the portions 754, 756 of the structure. The doublers 748(a) and (b) include a special prepreg material 750 that includes embedded fibers (not shown) that are coupled to a source of EM energy (not shown in FIG. 7). The prepreg material 750 absorbs EM energy from the EM energy source. The prepreg material 750 enables adequate bonding of the doublers 748(a) and 748(b) to the structure members 756 and 754. The use of the prepreg material 750 with the fibers as described herein enables adequate curing of the prepreg material 750 without over curing.

Figure 8:
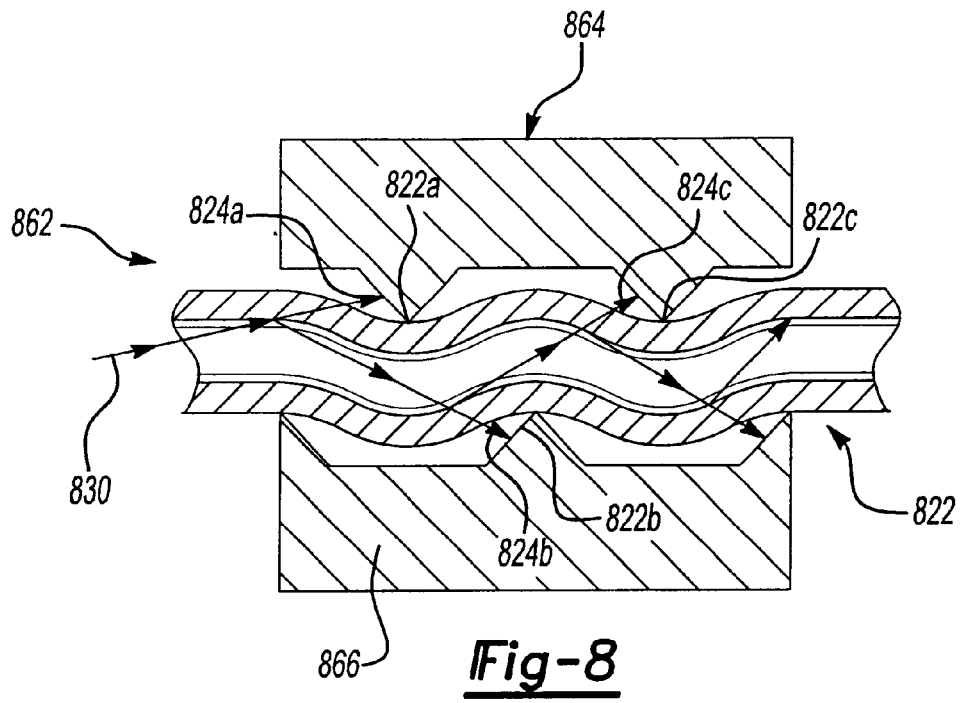
FIG. 8 shows a cross-sectional view of a fiber processed to emit energy from intermediate sections of the fiber.

FIG. 8 shows a cross-sectional view of a fiber 822 that has been processed by micro-bending. Bends at points 822(a), (b) and (c) cause energy 824(a), (b) and (c) from input energy 830, to be emitted from the fiber 822 at those intermediate points. Apparatus 862 has upper portion 864 lower portion 866 that can be used to bend fiber 822 in a predetermined manner. The number and placement of bends 822(a), (b) and (c) is a design choice and depends on the desired application for the fiber 822.

Figure 9:
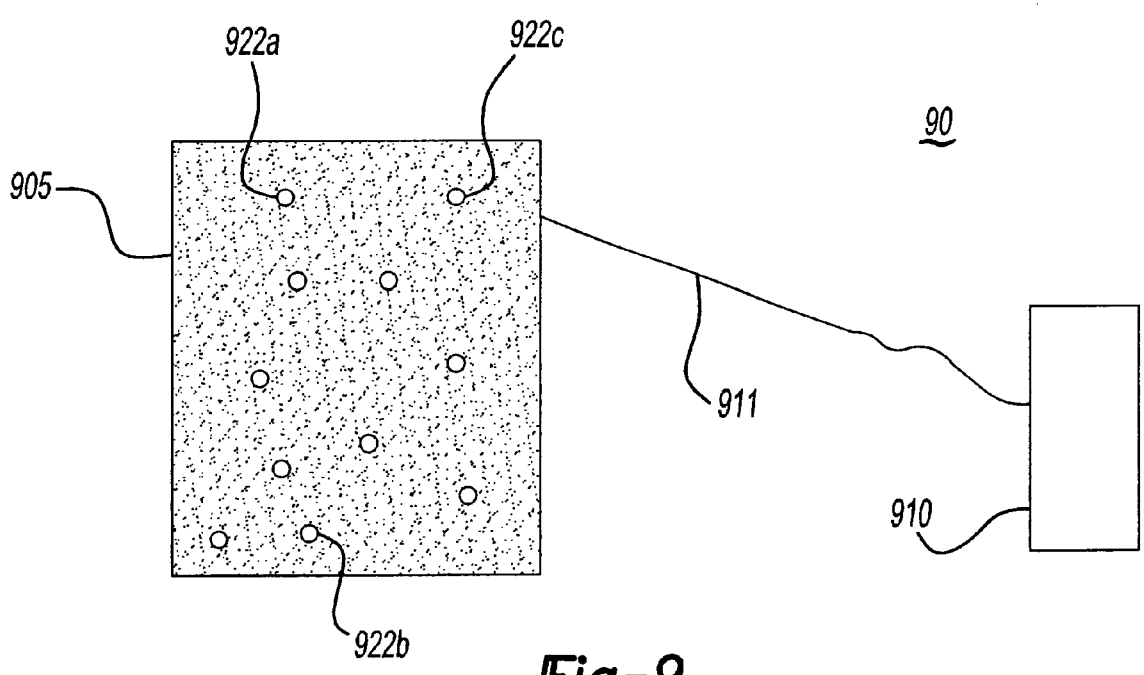
FIG. 9 shows a heating apparatus using processed fibers.

FIG. 9 shows an embodiment 90 that comprises a material 905 coupled to electromagnetic energy source 910. Fibers 922(a), (b), (c), are shown but the number of fibers is a design choice and not critical to understand the invention. Fibers 922 are embedded in the material 905 and receive electromagnetic energy from source 910 via interconnector 911. A thermocoupler (not shown) could be used if desired.

Fibers 922 are processed so that they emit thermal energy to material 905. Material 905 is suitably a thermoset polymer, a thermoplastic polymer or an epoxy material that has been cured and shaped in a useable form such as a mat. Material 905 is suitably positioned on a surface to increase the temperature of that surface, specifically, material 905 can be used to emit thermal energy to de-ice aircraft. The material 905 can be initially cured using photonic or thermal energy or a combination of both. After curing the material 905 is suitably shaped into a mat or blanket that will provide a source of heat without the risk of sparking. Such a heating mat 905 can be positioned on a helicopter engine inlet lips, ducts or rotor blades.

While the instant invention has been described in terms of repairing an aircraft structure, it is readily apparent to those skilled in the art that the use of fibers embedded within a sealant material to transmit and disburse energy for proper curing or heating could be applied to any structure.

While the invention has been described above with reference to specific embodiments thereof, it is apparent that many changes, modifications and variations can be made herein. Accordingly, it is intended to embrace all such changes, modifications and variations that fall within the spirit and broad scope of the appended claims.

What is claimed is:

1. A method for adhering a sealant material to a structure comprising:

disposing the sealant material on at least a portion of the structure, the sealant material having one or more non-metallic continuous fibers embedded therein;

providing electromagnetic energy to the one or more non-metallic continuous fibers;

transmitting electromagnetic energy from intermediate sections of the one or more non-metallic continuous fibers in the sealant material thereby curing the sealant material such that the sealant material fixedly adheres to the structure; and propagating excess electromagnetic energy through the sealant material without substantial absorption of the excess electromagnetic energy by the sealant material.

2. The method as claimed in claim 1, further comprising the step of providing the electromagnetic energy to an end of the one or more continuous fibers.

3. The method as claimed in claim 1, further comprising the step of irremovably embedding the non-metallic continuous fibers into the sealant material.

4. The method as claimed in claim 1, further comprising the step of providing electromagnetic energy along a length of the one or more non-metallic continuous fibers.

5. The method as claimed in claim 1 further comprising:

processing the fibers prior to embedding the fibers in the sealant material such that the fibers disburse electromagnetic energy from intermediate sections of the fibers.

6. The method as claimed in claim 5 wherein the processing is selected from the group consisting of bending, scratching, etching, doping, coating and crimping and combinations thereof.

7. The method as claimed in claim 6 further comprising:

fabricating the sealant material from a material selected from the group consisting of thermoset polymer and thermoplastic polymer.

8. The method as claimed in claim 7 further comprising:

generating the electromagnetic energy from a source selected from the group consisting of $CO_2$ lasers, Nd:YAG lasers Ho:YAG lasers, diode lasers, Er:YAG lasers and ruby lasers.

9. A method for adhering a sealant material to a structure comprising:

fabricating the sealant material from a material selected from the group consisting of thermoset polymer and thermoplastic polymer;

embedding a continuous fiber in the sealant material such that the fiber disburses electromagnetic energy from intermediate sections of the fiber;

processing the fiber prior to said embedding step, said processing selected from the group consisting of bending, scratching, etching, doping, coating, crimping and combinations thereof;

disposing the sealant material on at least a portion of the structure;

supplying electromagnetic energy to the continuous fiber from a source selected from the group consisting of $CO_2$ lasers, Nd:YAG lasers Ho:YAG lasers, diode lasers, Er:YAG lasers and ruby lasers to the fibers;

disbursing the electromagnetic energy from intermediate sections of the one or more fibers throughout the sealant material thereby curing the sealant material such that the sealant material fixedly adheres to the structure; and propagating excess electromagnetic energy through the sealant material without substantial absorption of the excess electromagnetic energy by the sealant material.

10. A method for adhering a sealant material to an aircraft structure comprising:

disposing the sealant material on at least a portion of the aircraft structure, the sealant material having a continuous non-metallic fiber embedded therein;

providing electromagnetic energy along the length of the continuous non-metallic fiber; and disbursing the electromagnetic energy from intermediate sections of the fiber into the sealant material thereby curing the sealant material such that the sealant material fixedly adheres to the structure.

11. The method as claimed in claim 10 wherein said disbursing step increases the cross-link density of the sealant material to self-limit the sealant material curing.

12. The method as claimed in claim 10 further comprising the step of providing the electromagnetic energy to an end of the one or more continuous fibers.

13. The method as claimed in claim 12 further comprising the step of irremovably embedding an opposite end of the one or more continuous fibers into the sealant material.

* * * * *